(12) United States Patent
Büttgen et al.

(10) Patent No.: US 10,677,923 B2
(45) Date of Patent: Jun. 9, 2020

(54) OPTOELECTRONIC MODULES FOR DISTANCE MEASUREMENTS AND/OR MULTI-DIMENSIONAL IMAGING

(71) Applicant: AMS SENSORS SINGAPORE PTE., LTD., Singapore (SG)

(72) Inventors: Bernhard Büttgen, Adliswil (CH); Moshe Doron, San Francisco, CA (US)

(73) Assignee: ams Sensors Singapore Pte. Ltd., Singapore (SG)

( * ) Notice: Subject to any disclaimer, the term of this patent is extended or adjusted under 35 U.S.C. 154(b) by 314 days.

(21) Appl. No.: 15/526,126

(22) PCT Filed: Nov. 9, 2015

(86) PCT No.: PCT/SG2015/050442
§ 371 (c)(1),
(2) Date: May 11, 2017

(87) PCT Pub. No.: WO2016/076796
PCT Pub. Date: May 19, 2016

(65) Prior Publication Data
US 2017/0329012 A1    Nov. 16, 2017

Related U.S. Application Data

(60) Provisional application No. 62/078,716, filed on Nov. 12, 2014.

(51) Int. Cl.
*G01C 3/08*    (2006.01)
*G01S 17/48*   (2006.01)
(Continued)

(52) U.S. Cl.
CPC .............. *G01S 17/48* (2013.01); *G01B 11/25* (2013.01); *G01C 3/08* (2013.01); *G01S 7/4914* (2013.01);
(Continued)

(58) Field of Classification Search
CPC .......... G01S 17/48; G01S 17/36; G01S 17/89; G01S 17/46; G01S 7/4914; G01B 11/25; G01C 3/08
See application file for complete search history.

(56) References Cited

U.S. PATENT DOCUMENTS 7,671,671 B2    3/2010    Buettgen et al.
2013/0140433 A1  6/2013    Oggier
(Continued)

FOREIGN PATENT DOCUMENTS

EP    2017651       1/2009
EP    02140288 B1   2/2012
(Continued)

OTHER PUBLICATIONS

International Search Report and Written Opinion issued by ISA/AU for PCT/SG2015/050442 (dated Mar. 17, 2016).

*Primary Examiner* — Samantha K Abraham
(74) *Attorney, Agent, or Firm* — Michael Best & Friedrich LLP

(57) ABSTRACT

The present disclosure describes optoelectronic modules that, in some implementations, address the need to combine precise measurements of scenes over a range of near and far distances. For example, an optoelectronic module can include a light emitter operable to direct modulated structured light onto a scene. The module includes an imager to receive reflected light signals from the scene. The imager includes demodulation pixels operable to provide amplitude and phase information based on the reflected light signals. Various techniques can be used to derive distance or three-dimensional information about the scene based on the signals from the pixels.

10 Claims, 7 Drawing Sheets

(51) Int. Cl.
*G01S 17/89* (2020.01)
*G01S 17/46* (2006.01)
*G01S 17/36* (2006.01)
*G01S 7/4914* (2020.01)
*G01B 11/25* (2006.01)

(52) U.S. Cl.
CPC .............. *G01S 17/36* (2013.01); *G01S 17/46* (2013.01); *G01S 17/89* (2013.01)

(56) References Cited

U.S. PATENT DOCUMENTS

| | | |
|---|---|---|
| 2013/0148102 A1 | 6/2013 | Oggier |
| 2014/0071180 A1* | 3/2014 | Shin .................. G09G 5/10 345/690 |
| 2014/0098358 A1 | 4/2014 | Koers |
| 2017/0090018 A1 | 3/2017 | Buettgen et al. |

FOREIGN PATENT DOCUMENTS

| | | |
|---|---|---|
| EP | 2487504 A1 | 8/2012 |
| WO | 2008/125936 | 10/2008 |
| WO | 2013/121267 | 6/2013 |

\* cited by examiner

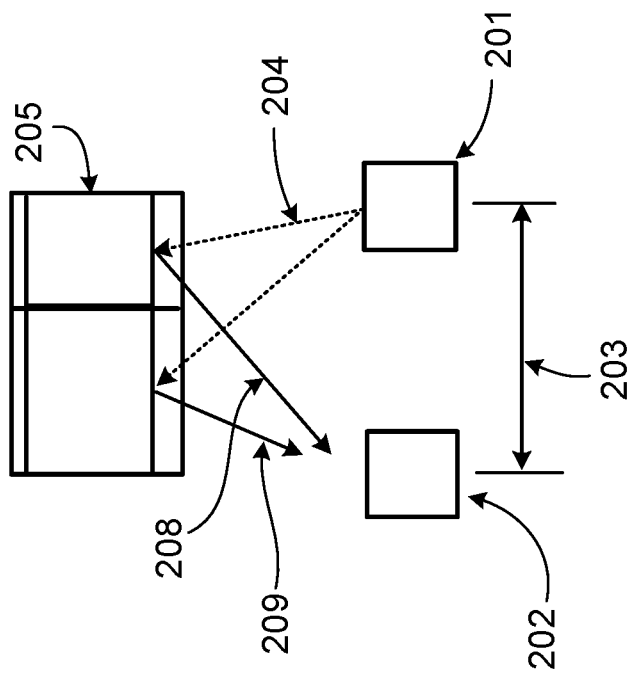
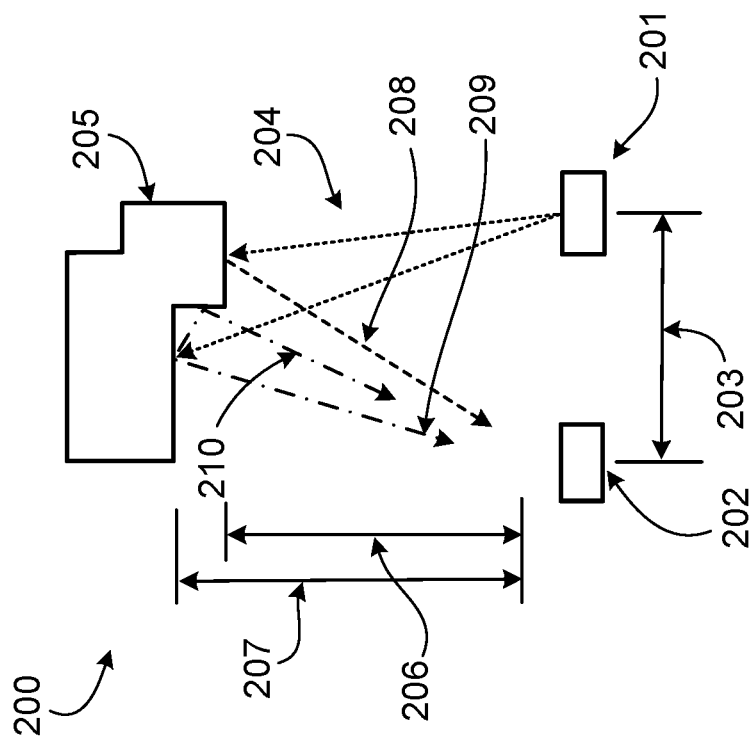

OPTOELECTRONIC MODULES FOR DISTANCE MEASUREMENTS AND/OR MULTI-DIMENSIONAL IMAGING

CROSS-REFERENCE TO RELATED APPLICATION(S)

This application claims the benefit of priority of U.S. Provisional Patent Application No. 60/078,716, filed on Nov. 12, 2014. The disclosure of the earlier application is incorporated herein by reference in its entirety.

TECHNICAL FIELD

This disclosure relates to optoelectronic modules for distance measurements and/or multi-dimensional imaging.

BACKGROUND

Optoelectronic modules employing triangulation and/or emitted-light techniques may be used to measure distance to a scene and/or recreate a multi-dimensional rendering of a scene (e.g., recreation of a scene in three dimensions or recreation of a moving scene in three dimensions as a function of time). A triangulation technique may employ an imager and a light emitter. The precision and/or suitability of a distance measurement may be largely a function of the baseline distance between the imager and light emitter. For example, large baselines usually produce smaller errors in distance measurements; however, objects or scenes in closer proximity to the imager may be occluded (i.e., outside of the field of view of either the imager or light emitter). Consequently, in some cases, larger baselines are more suitable for scenes or objects at longer distances, while in other cases smaller baselines are more suitable for scenes or objects at shorter distances. However, miniaturization of technology, for example personal consumer technology such as smart phones, prevents the implementation of large baselines in optoelectronic modules for proximity measurements and/or multi-dimensional imaging.

Other techniques may be employed for accurate distance measurements. Optoelectronic modules using time of flight (TOF) technology are suitable for measuring the distance of scenes at long/far distances. TOF requires a modulated light emitter to direct modulated light onto an object/scene, and an imager (TOF imager) including an optical assembly and sensor. The sensor includes de-modulation pixels (TOF pixels) that may derive distance information from the change in phase of modulated light reflected by a scene. The precision/accuracy/suitability of the technique is not strongly dependent on the baseline distance between the TOF imager and modulated light emitter. The TOF technique, however, may have some drawbacks; for example, data derived from the TOF technique may suffer from multi-path distance errors.

Accordingly, an optoelectronic module is needed that: 1) can combine precise/suitable measurements of scenes over a range of short distances (e.g., sub-centimeter) to long distances (e.g., 20 meters or even 30 meters or more), 2) occupies a small footprint, and 3) mitigates multi-path distance errors.

SUMMARY

The present disclosure relates to optoelectronic modules that, in some implementations, address the need to combine precise, suitable measurements of scenes over a range of short/near to long/far distances in an optoelectronic module with a small footprint and that further can mitigate multi-path distance errors. Details of particular implementations are described below.

In one aspect, the disclosure describes an optoelectronic module including a light emitter operable to direct modulated structured light onto a scene. The module includes an imager to receive reflected light signals from the scene. The imager includes demodulation pixels operable to provide amplitude and phase information based on the reflected light signals.

Some implementations include one or more of the following features. For example, in some instances, at least some of demodulation pixels are binned together so that output signals from the binned demodulation pixels collectively provide at least one of the amplitude or phase information. The module may be operable for dynamic binning in which the number of demodulation pixels binned together varies over time.

In some cases, the light emitter is operable to direct modulated structured light at different modulation frequencies. Further, in some implementations, the light emitter is operable to direct different modulated structured light patterns onto the scene at different times.

In another aspect, the disclosure describes a method of obtaining distance or three-dimensional data of a scene. The method includes directing modulated structured light onto the scene and sensing, by an imager, reflected light signals from the scene. Amplitude and phase information is derived from signals generated by the imager's demodulation pixels.

Some implementations include one or more of the following features. For example, in some instances, the method includes binning together a multitude of the demodulation pixels so that the signals generated by the binned demodulation pixels collectively provide at least one of the amplitude or phase information. In some cases, the demodulation pixels are dynamically binned such that the number of the demodulation pixels binned together varies over time. The method can include directing onto the scene modulated structured light of a first modulation frequency during a first time period, and directing onto the scene modulated structured light of a second modulation frequency during a different second time period. Distance or three-dimensional data of the scene can be derived from at least one of the amplitude or phase information.

In accordance with yet another aspect a method includes directing a respective modulated structured light pattern onto the scene at different times, wherein the light pattern directed onto the scene at a particular time differs from at least some of the light patterns directed onto the scene at other times. The method includes sensing, by an imager, reflected light signals from the scene during the different time frames, and deriving distance or three-dimensional information about the scene based on signals from the imager's demodulation pixels. Some implementations include deriving the distance or three-dimensional information using one or more of the following: (i) distortion between illuminated pixels of the imager; (ii) triangulation; or (iii) a time of flight technique.

The combination of time of flight (TOF) and structured light (SL) techniques via the same hybrid sensor can provide various advantages in some implementations. For example, background light may be suppressed when collecting signals used for both TOF and SL techniques as the signals used for both techniques are collected with TOF demodulation pixels. Further, data may be collected for both TOF and SL techniques simultaneously. Additionally, modulated structured light directed onto a scene may be driven at different modulation frequencies, and may be tuned for different distances and/or different techniques (e.g., TOF and SL).

Other aspects, features and advantages will be readily apparent from the following detailed description, the accompanying drawings, and the claims.

BRIEF DESCRIPTION OF THE DRAWINGS

FIG. 2A depicts an example of an optoelectronic module employing a time of flight technique in a plan-view.

FIG. 2B depicts the optoelectronic module employing a time of flight technique in another view.

DETAILED DESCRIPTION

Figure 1B:
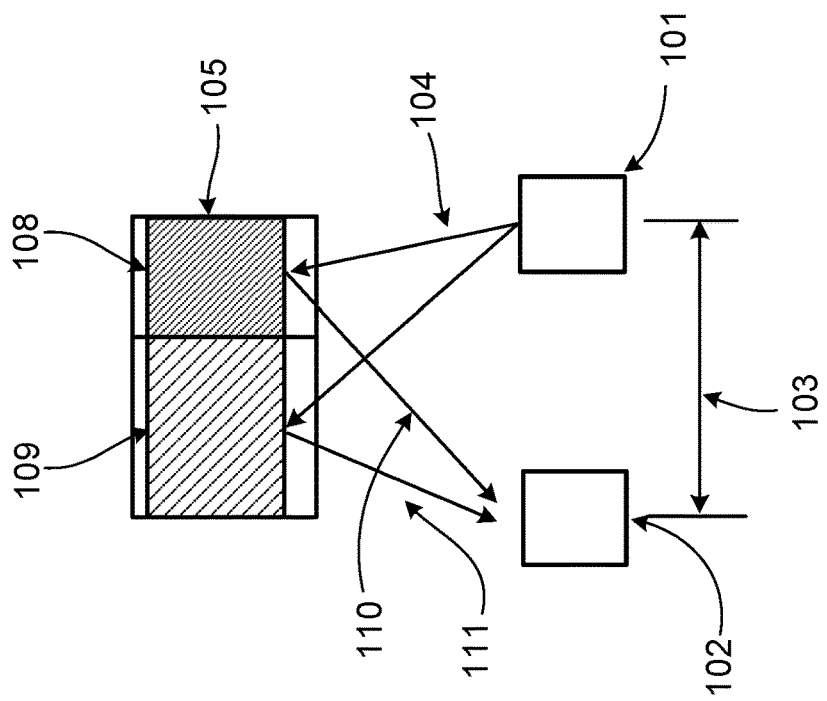
FIG. 1B depicts the optoelectronic module employing a structured-light technique in another view.
Figure 1A:
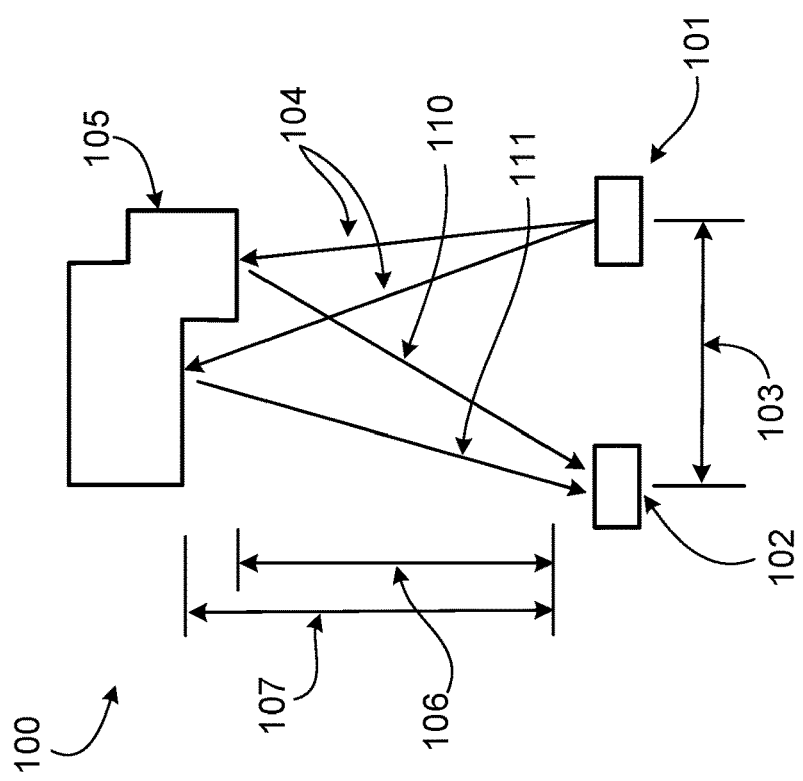
FIG. 1A depicts an example of an optoelectronic module employing a structured-light technique in a plan-view.

An optoelectronic module employing a structured-light technique is depicted in FIG. 1A in a plan-view and in FIG. 1B in another view. The module 100 includes a structured light emitter 101 and a structured light imager 102 separated by a light emitter-imager baseline 103. The structured light emitter 101 directs structured light 104 onto a scene 105 (e.g., a three-dimensional scene). Structured light 104 may include a multitude of discrete illuminations, for example, a regular or irregular pattern of discrete illuminations such as a regular or irregular array of speckles, stripes, and/or dots. Features of the scene are positioned at a $1^{st}$ scene distance 106, and a $2^{nd}$ scene distance 107, with respect to the module 100.

Structured light 104 incident on the scene 105 at the 1st scene distance 106 results in a 1st structured light illumination 108, and structured light 104 incident on the scene 105 at the 2nd scene distance 107 results in a 2nd structured light illumination 109. 1st and 2nd structured light illuminations 108, 109, respectively are reflected from the scene 105 and are incident on the structured light imager 102. Accordingly, distance and/or three-dimensional data of the scene 105 are derived from reflected light 108, 109, and recorded and/or processed according to known techniques. For example, in some cases distance data may be calculated from differences between 108 and 109. In other cases distance data may be calculated from distortions of 108 and 109. Still in other cases 108, 109 reflected from scene 105 and incident on the imager 102 may be used to calculate distances, e.g., via triangulation techniques. Collectively, these and similar techniques are herein termed structured-light (SL) techniques.

An optoelectronic module employing a TOF technique is depicted in FIG. 2A in a plan-view and in FIG. 2B in another view. The module 200 includes a modulated light emitter 201 and a TOF imager 202 separated by an emitter-imager baseline 203. The modulated light emitter 201 directs modulated light 204 onto a scene 205 (e.g., a three-dimensional scene). Modulated light 204 is typically unstructured, that is, a multitude of discrete illuminations are not employed; accordingly features of the scene are largely uniformly illuminated. Features of the scene are positioned at a $1^{st}$ scene distance 206, and a $2^{nd}$ scene distance 207, with respect to the module 200.

Modulated light 204 incident on the scene 205 at the $1^{st}$ scene distance 206 results in a $1^{st}$ reflection of modulated light 208, and modulated light 204 incident on the scene 205 at the $2^{nd}$ scene distance 207 results in a $2^{nd}$ reflection of modulated light 209. $1^{st}$ and $2^{nd}$ reflections of modulated light 208, 209, respectively are incident on the TOF imager 202. Accordingly, distance and/or three-dimensional data of the scene 205 can be derived from a phase shift in the modulated light observed in the $1^{st}$ reflection 208. Similarly, distance and/or three-dimensional data of the scene 205 can be derived from a phase shift of the modulated light observed in the $2^{nd}$ reflection 209. The derived distance and/or three-dimensional data of the scene 205 can be recorded and/or processed as is known in the art—herein this technique is termed a TOF technique. In general, the phase shifts observed in reflected 208, 209 are observed via a demodulation pixel (TOF pixel) specifically designed to extract phase information from incident modulated light. Errors in the three-dimensional data of the scene 205 may be due to multi-reflected light 210 as depicted in FIG. 2A.

Figure 3B:
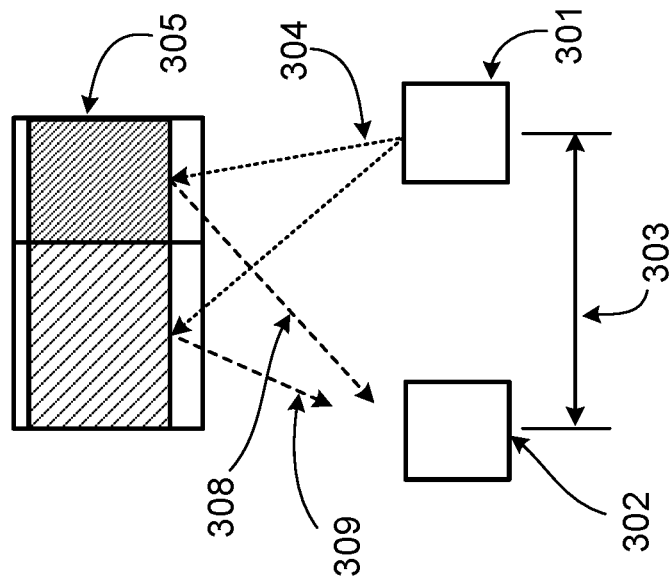
FIG. 3B depicts the optoelectronic module employing a hybrid technique in another view.
Figure 3A:
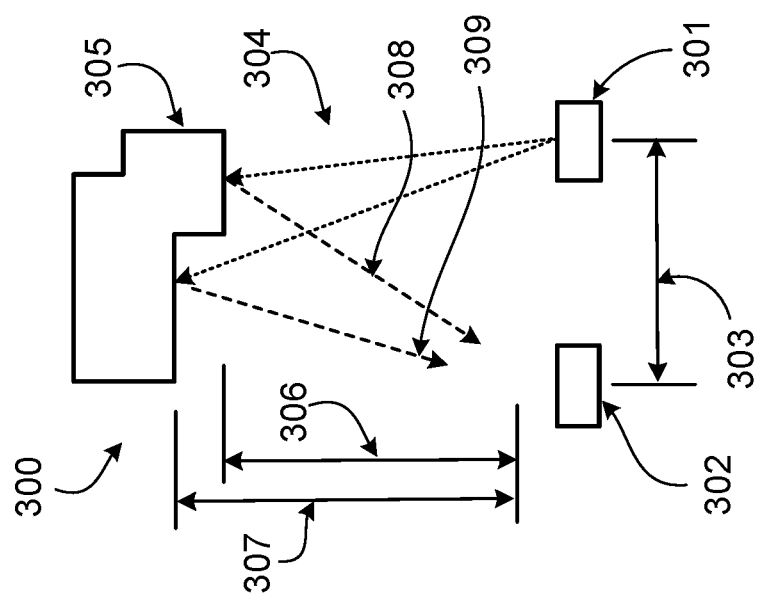
FIG. 3A depicts an example of an optoelectronic module employing a hybrid technique in a plan-view.

FIG. 3A and FIG. 3B depict an optoelectronic module employing a hybrid technique in a plan-view and another view, respectively. The module 300 includes a modulated structured light hybrid emitter 301 and a hybrid TOF imager 302 separated by a emitter-imager baseline 303. The hybrid light emitter 301 directs modulated structured light 304 onto a scene 305 (e.g., a three-dimensional scene). Modulated structured light 304 is both structured and modulated; that is, it includes a multitude of discrete illuminations, and it is modulated at a particular frequency (e.g. 10 MHz) or frequencies. Consequently, features of the scene are not uniformly/homogeneously illuminated but discretely illuminated. In some cases the modulated structured light 304 may be infrared red light, e.g. 850 nm, and/or 900 nm or other invisible light (e.g., pulsed light in the visible part of the spectrum). $1^{st}$ reflected light 308 and $2^{nd}$ reflected light 309 may be used to determine the distance of features in a scene at $1^{st}$ and $2^{nd}$ scene distances 306, 307 over a large range of distances.

In some instances when the $1^{st}$ scene distance 306 and $2^{nd}$ scene distance 307 are near/short with respect to the module 300 (e.g., 1 meter or less) the modulated structured light may be used to calculate 306, 307 via SL techniques as depicted in FIG. 1A and FIG. 1B and discussed in connection with FIG. 1A and FIG. 1B. However, in other instances when the $1^{st}$ scene distance 306 and $2^{nd}$ scene distance 307 are far/large with respect to the module 300 (e.g., 10 meter or more) the modulated structured light may be used to calculate 306, 307 via the phase shift of the reflected modulated structured light 308, 309 as depicted in FIG. 2A and FIG. 2B and discussed in connection with FIG. 2A and FIG. 2B disclosed above. Still further at intermediate distances (e.g., 1 meter) both TOF and SL techniques may be employed.

The combination of the aforementioned techniques for scenes at various distances has a number of advantages, for example, data derived from SL and TOF techniques may be combined to calibrate the module 300, i.e., TOF-derived data may be used to calibrate data derived via SL where data derived via SL may be in error due to an unknown/uncalibrated baseline distance between emitter and imager. In another instance the combined data may reduce multi-path distance errors by cross-referencing distance data obtained via both TOF and SL techniques. The use of modulated structured light may further reduce multi-path distance errors since the directed modulated structured light includes discrete illuminations; accordingly, the probability of producing multi-path reflections is reduced.

Figure 4A:
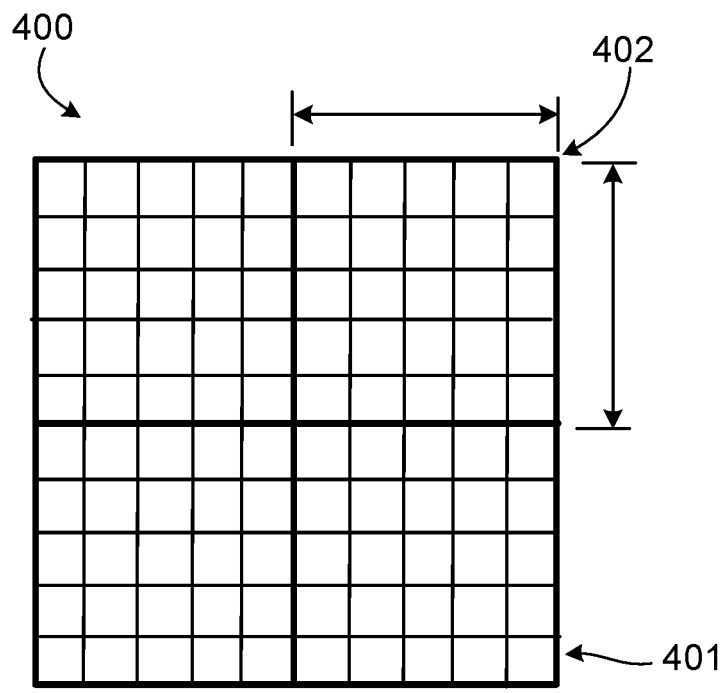
FIG. 4A depicts an example of a hybrid TOF pixel array with binned pixels each composed of twenty-five discrete pixels.
Figure 4B:
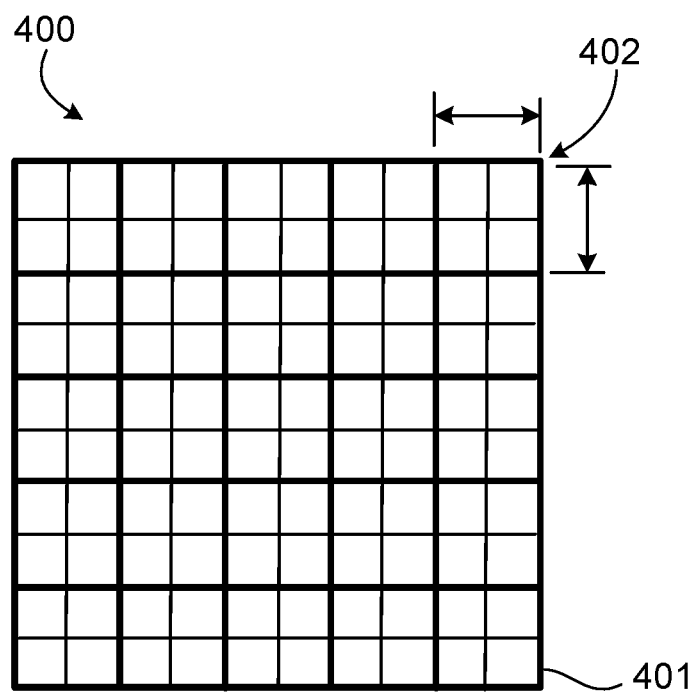
FIG. 4B depicts another example of a hybrid TOF pixel array with binned pixels each composed of four discrete pixels.

In some instances the combination of both SL and TOF techniques requires a hybrid TOF pixel array. An example of a hybrid TOF pixel array 400 is depicted in FIG. 4A. The hybrid TOF pixel array 400 includes discrete TOF pixels 401. The TOF pixels 401 are designed to extract phase information and amplitude information from modulated light. In a first example, depicted in FIG. 4A, the pixel array 400 may include a binned pixel 402, which may include a multitude of discrete pixels 401. The binned pixel 402 may be attained via, e.g., on-chip or off-chip binning. A signal from a binned pixel 402 may include signals extracted from discrete pixels 401 within the binned pixel 402. This may be particularly useful where structured (non-homogenous) light is directed onto the scene because, in such situations, some pixels 401 may receive only relatively low intensity illumination For example, in some cases the magnitude of a signal from a single discrete pixel 401 may be insufficient to provide phase-shift data; however the collective signals from a binned pixel 402 may be of sufficient magnitude to provide phase-shift data over the entire binned pixel 402. Further, the magnitude of a signal from a single discrete pixel 401 may be sufficient to provide data for SL techniques disclosed above. In some cases (e.g., light of relative low intensity) a binned TOF pixel 402 may include a large array of discrete pixels, e.g., 25 discrete pixels as depicted in FIG. 4A, while in other cases (e.g., light of relative high intensity) a binned TOF pixel 402 may include a smaller array of discrete pixels, e.g., 4 discrete pixels as depicted in FIG. 4B.

In other cases the magnitude of a signal from a single discrete pixel 401 may be insufficient to provide data for SL techniques disclosed above; however the collective signals from a binned pixel 402 may be of sufficient magnitude to provide data for the SL techniques over the entire binned pixel 402. Further, the magnitude of a signal from a single discrete pixel 401 may be sufficient to provide phase-shift data (in which distance data is derived via TOF techniques disclosed above).

The combination of TOF and SL techniques via the same hybrid TOF sensor has a multitude of further advantages. For example, background light may be suppressed when collecting signals used for both TOF and SL techniques as the signals used for both techniques are collected with TOF demodulation pixels. Further, data may be collected for both TOF and SL techniques simultaneously. Additionally, modulated structured light directed onto a scene may be driven at different modulation frequencies, and may be tuned for different distances and/or different techniques (e.g., TOF and SL). For example, in some cases using high modulation frequencies for structured light may result in more precise/accurate distance data derived using TOF techniques, while using lower frequency modulated light may result in more precise/accurate distance data derived using SL techniques.

Figure 5:
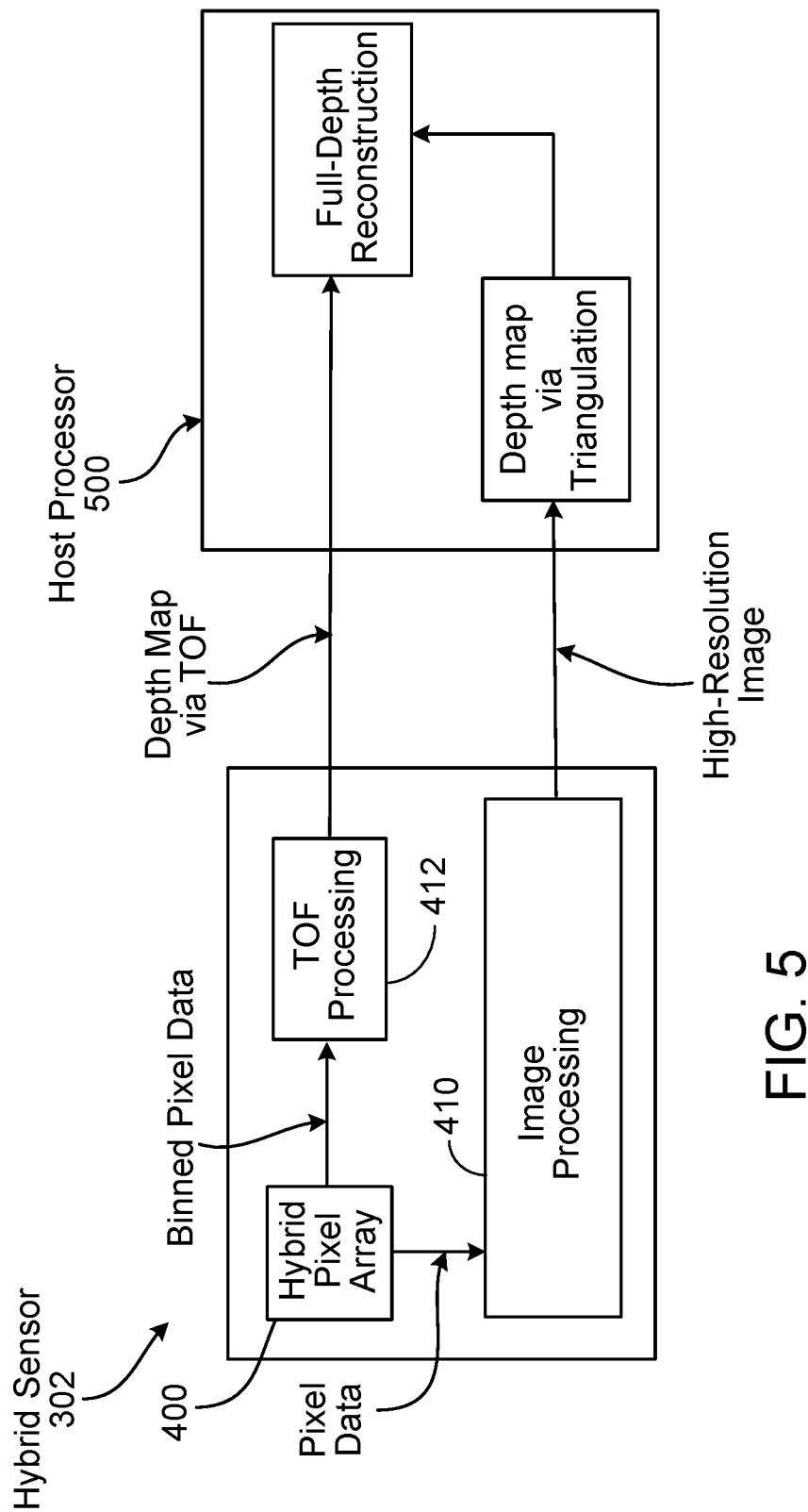
FIG. 5 depicts an example of an interface of a hybrid TOF sensor and a host processor.

FIG. 5 depicts the interface of a hybrid TOF sensor 302 and a host processor 500, such as may be integrated as part of a personal computing device (e.g., a mobile phone, a smart phone, a tablet, a personal digital assistant (PDA), or laptop). The sensor 302 includes a hybrid pixel array 400 and may include on-chip read-out and processing circuitry 410 to read out and process data from discrete pixels. The processing circuitry 410 can generate a high-resolution image, which is provided to the host processor 500, which derives a depth map using, for example, triangulation. The sensor 302 also may include on-chip TOF read-out and processing circuitry 412 to read out and process data from binned pixels. The circuitry 412 can generate a depth map, for example, using known TOF techniques. Both depth maps (i.e., the one derived by triangulation or other SL techniques and the one derived by the TOF technique) can be processed further by the host processor 500 according to known full-depth reconstruction techniques to generate a three-dimensional image or distance data for the scene.

Figure 6:
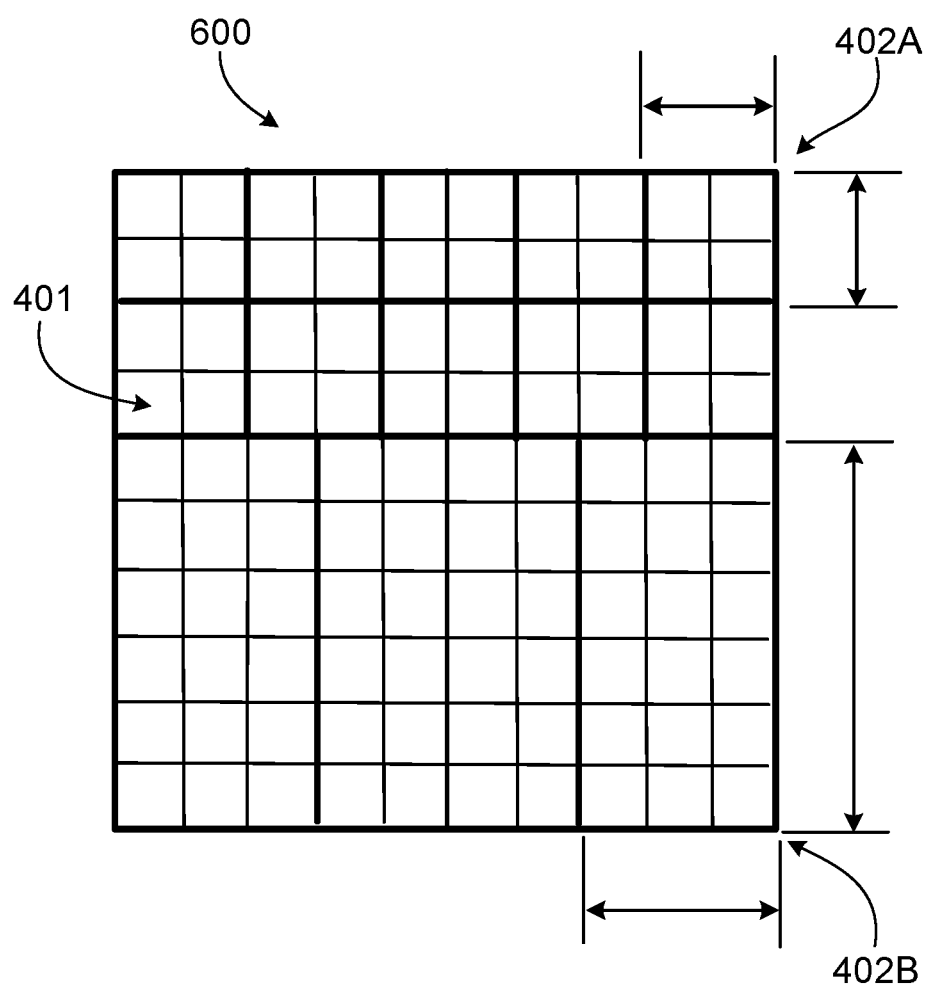
FIG. 6 depicts an example of a hybrid TOF pixel array with multi-sized binned pixels.

FIG. 6 depicts a hybrid TOF pixel array 600 with multi-sized binned pixels. In some instances, e.g., when binning is accomplished via off-chip binning, multiple multi-sized binned pixels may be employed to extract accurate/precise distance data. The array 600 includes multiple binned pixels (such as binned pixel 402A) each of which has four discrete pixels 401. Each binned pixel 402A is a 2×2 array of pixels 401. The array 600 also includes multiple binned pixels (such as binned pixel 402B) each of which has twenty-five discrete pixels 401. Each binned pixel 402B is a 5×5 array of pixels 401. In some cases, this approach may further be useful to improve resolution of the TOF and/or SL techniques. The size of the binned pixels 402A, 402B may differ in other implementations.

In some instances, dynamic binning can be implemented for the demodulation pixels such that the number of the demodulation pixels binned together varies over time.

In some instances where the magnitude of signals produced from discrete illuminations is too small in magnitude to provide phase-shift data, a negative point pattern may be employed. That is, the illumination pattern directed on to the scene 105 includes a nearly uniform/homogenous illumination, but with discrete holes (i.e., regions that are not illuminated). In some cases, the holes may be used to provide SL data while the nearly uniform/homogeneous illumination may be used to provide TOF data.

Figure 7A:
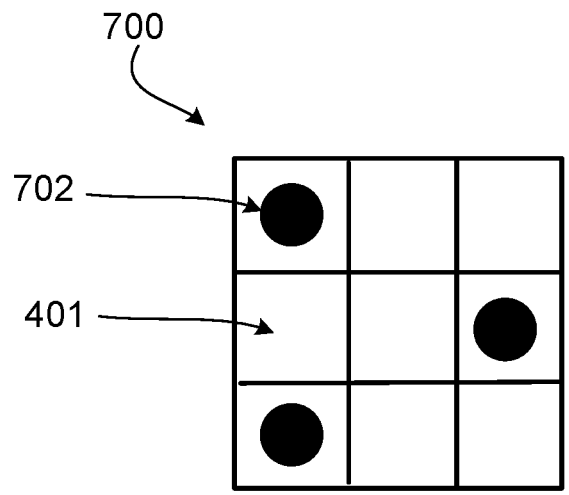
FIG. 7 depicts an example of a dynamic illumination pattern superimposed onto a pixel array.
Figure 7B:
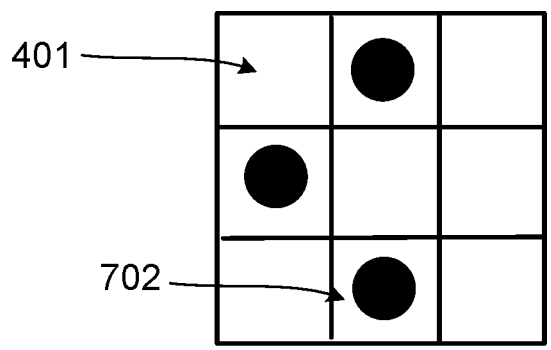
Figure 7C:
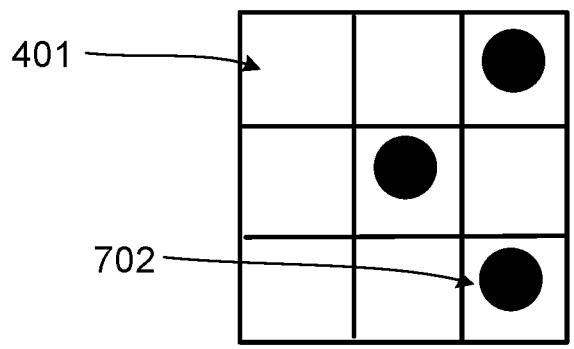

FIG. 7 depicts an example of a dynamically changing modulated structured light pattern superimposed onto a pixel array 700. In this example, the hybrid emitter (e.g., 301) directs modulated structured illumination that differs from one time frame to the next. FIG. 7 illustrates examples of three such time frames, labelled (a), (b) and (c). The illumination pattern for each time frame is indicated by dots 702. Distance data or three-dimensional information about the scene can be obtained based on one or more of the following: (i) distortion between illuminated points of the array 700; (ii) triangulation; and/or (iii) TOF.

Dynamically changing the modulated structured illumination pattern, as in FIG. 7, can provide various advantages in some implementations. For example, better resolution can be obtained for triangulation, and good spatial resolution can be obtained for TOF techniques. The use of multiple patterns can help alleviate multi-path problems. The binning techniques discussed above can be applied to the implementation of FIG. 7 as well.

Various modifications may be made to the foregoing implementations. Features described above in different implementations may be combined in the same implementations. Thus, other implementations are within the scope of the claims.

What is claimed is:

1. An optoelectronic module comprising:
   a light emitter operable to direct modulated structured light onto a scene; and
   an imager to receive reflected light signals from the scene, the imager comprising a plurality of demodulation pixels operable to provide amplitude and phase information based on the reflected light signals, wherein at least some of the demodulation pixels are binned together in an N×M array of pixels, where each of N and M is ≥2, so that output signals from the binned demodulation pixels collectively provide at least one of the amplitude or phase information.

2. The optoelectronic module of claim 1 operable for dynamic binning in which a number of the demodulation pixels binned together varies over time.

3. The optoelectronic module of claim 1 wherein the light emitter is operable to direct modulated structured light at different modulation frequencies.

4. The optoelectronic module of claim 1 wherein the light emitter is operable to direct different modulated structured light patterns onto the scene at different times.

5. The method of claim 1 including dynamically binning the demodulation pixels such that a number of the demodulation pixels binned together varies over time.

6. A method of obtaining distance or three-dimensional data of a scene, the method comprising:
   directing modulated structured light onto the scene;
   sensing, by an imager, reflected light signals from the scene, the imager including a plurality of demodulation pixels, wherein at least some of the demodulation pixels are binned together in an N×M array of pixels, where each of N and M is ≥2, so that signals generated by the binned demodulation pixels collectively provide at least one selected from a group consisting of amplitude and phase information; and
   deriving the at least one selected from the group consisting of amplitude and phase information from the signals generated by the demodulation pixels.

7. The method of claim 6 including directing onto the scene modulated structured light of a first modulation frequency during a first time period, and directing onto the scene modulated structured light of a second modulation frequency during a different second time period.

8. The method of claim 6 including deriving the distance or three-dimensional data of the scene from at least one of the amplitude or phase information.

9. A method of obtaining distance or three-dimensional data of a scene, the method comprising:
   directing a respective modulated structured light pattern onto the scene at different times, wherein the modulated structured light pattern directed at a particular time differs from at least some of the modulated structured light patterns directed at other times;
   sensing, by an imager, reflected light signals from the scene during the different time frames, the imager including a plurality of demodulation pixels; and
   deriving distance or three-dimensional information about the scene based on signals from the demodulation pixels.

10. The method of claim 9 including deriving the distance or three-dimensional information using one or more of the following: (i) distortion between illuminated pixels of the imager; (ii) triangulation; or (iii) a time of flight technique.

* * * * *